United States Patent [19]

Duffy

[11] Patent Number: 4,940,593
[45] Date of Patent: Jul. 10, 1990

[54] MULTICOLORED R-T-E CEREAL AND METHOD OF PREPARATION

[75] Inventor: David K. Duffy, Maple Grove, Minn.

[73] Assignee: General Mills, Inc., Minneapolis, Minn.

[21] Appl. No.: 342,155

[22] Filed: Apr. 24, 1989

[51] Int. Cl.$^5$ .......................... A23L 1/118; A23L 1/64
[52] U.S. Cl. ...................................... 426/94; 426/250; 426/249; 426/540; 426/620; 426/621
[58] Field of Search ............... 426/620, 621, 540, 249, 426/94, 250

[56] References Cited

U.S. PATENT DOCUMENTS

| 987,089 | 3/1911 | Perky | 426/249 |
|---|---|---|---|
| 2,788,277 | 4/1957 | Huber | 426/540 |
| 2,858,219 | 10/1958 | Benson | 426/620 |
| 3,027,258 | 3/1962 | Markakis et al. | 426/540 |
| 3,499,766 | 3/1970 | Vollink et al. | 426/249 |
| 3,570,417 | 3/1971 | Herrmann et al. | 426/540 |
| 3,656,966 | 4/1972 | Ball et al. | 426/249 |
| 3,690,896 | 9/1972 | Maxwell | 426/540 |
| 4,603,055 | 7/1986 | Karwowski et al. | 426/249 |
| 4,696,825 | 9/1987 | Leibfred | 426/620 |
| 4,795,647 | 1/1989 | Leibfred | 426/620 |

*Primary Examiner*—Jeanette Hunter
*Attorney, Agent, or Firm*—John A. O'Toole

[57] ABSTRACT

Disclosed are multicolored cereal pieces and methods of preparation. In preferred embodiments, the cereal pieces have an upper layer and a bottom layer, at least one of which layer is characterized by regions of a plurality of different colors. The methods for fabricating the present multicolored cereal pieces involves preparing separate segregated quantities of low moisture, free flowing cooked cereal dough pellets of individual colors, separately cooling the separate quantities of pellets, admixing the separate batches while cool with low shear mixing to form a blended assortment of multicolored free flowing pellets, warming the pellets, sheeting the pellets to form a sheet with regions of various colors, forming individual pieces from the sheet and finishing the pieces to form R-T-E cereals with multiple colors.

29 Claims, 2 Drawing Sheets

MULTICOLORED R-T-E CEREAL AND METHOD OF PREPARATION

BACKGROUND OF THE INVENTION

1. Technical Field

The present invention relates to food products and to their methods of preparation. More particularly, the present invention relates to ready-to-eat cereals and to their methods of preparation.

2. The Prior Art

Ready-to-eat ("R-T-E") cereals are popular food items. Over the years, R-T-E cereals have been prepared in a wide variety of shapes, sizes, compositions, textures, flavors and the like. Especially popular are those R-T-E cereals which appeal to children. Children are very choosy about food selection generally, including R-T-E cereals. R-T-E cereals can be nutritious, wholesome, convenient, and if well developed, appealing and popular among children. Conventionally, children's R-T-E cereals are presweetened and strongly flavored. Great attention has been given towards providing novelty appeal to children's R-T-E cereals. To this end, R-T-E cereals are frequently flavored, often of complex or interesting shapes, and occasionally colored.

Colored R-T-E cereals are well known. Generally, R-T-E pieces are uniform in color throughout the cereal piece. It is also conventionally known to employ blends of R-T-E cereal pieces comprising more than one color, e.g., one-third red, one-third yellow, one-third orange. Typically, the individual cereal pieces are cooked and prepared, including puffing, in separate batches of one color. Thereafter, the individual batches are blended together prior to packaging.

Attempts at incorporating more than one color into an individual cereal piece have met great difficulty. Generally, any attempt at providing such cereal pieces results in a blending and bleeding of the colors together to form an undesired brown or even gray color. More recently, however, composite cereal pieces comprising an upper layer of one color and composition and a second layer of a second color and composition have been introduced into the market. Such cereals have been sold under the trademark Crispix.

Notwithstanding the provision of an R-T-E cereal piece having upper and lower layers which differ in color (and incidentally in composition) there is a continuing need for novel and visually appealing R-T-E cereal pieces characterized by a plurality of colors in at least one layer of the cereal piece. Surprisingly, a convenient process has now been discovered by which such novel R-T-E cereal pieces can be realized.

SUMMARY OF THE INVENTION

Disclosed are methods for preparing multicolored R-T-E cereal pieces and to the R-T-E cereals prepared thereby.

The present methods comprise the steps of: (A) providing separate segregated quantities of low moisture, cooked cereal dough pellets, (B) separately cooling the pellet quantities to achieve free flow, admixing the separate pellet quantities while cool with low shear mixing, (C) warming the admixed pellets, (D) sheeting the pellets to form a varigated color sheet, (E) forming individual pieces from the sheet and (F) finishing the pieces to form R-T-E cereals with multiple colors. In additional embodiments, the present invention resides in laminated R-T-E cereal pieces wherein one or both of the layers comprise the present, novel multicolor layers.

BRIEF DESCRIPTION OF THE DRAWINGS

FIGS. 1A and 1B collectively show a block flow sheet illustrating the general method of carrying out the present processes for producing multicolored R-T-E cereal pieces.

DETAILED DESCRIPTION OF THE INVENTION

Figure 2A:
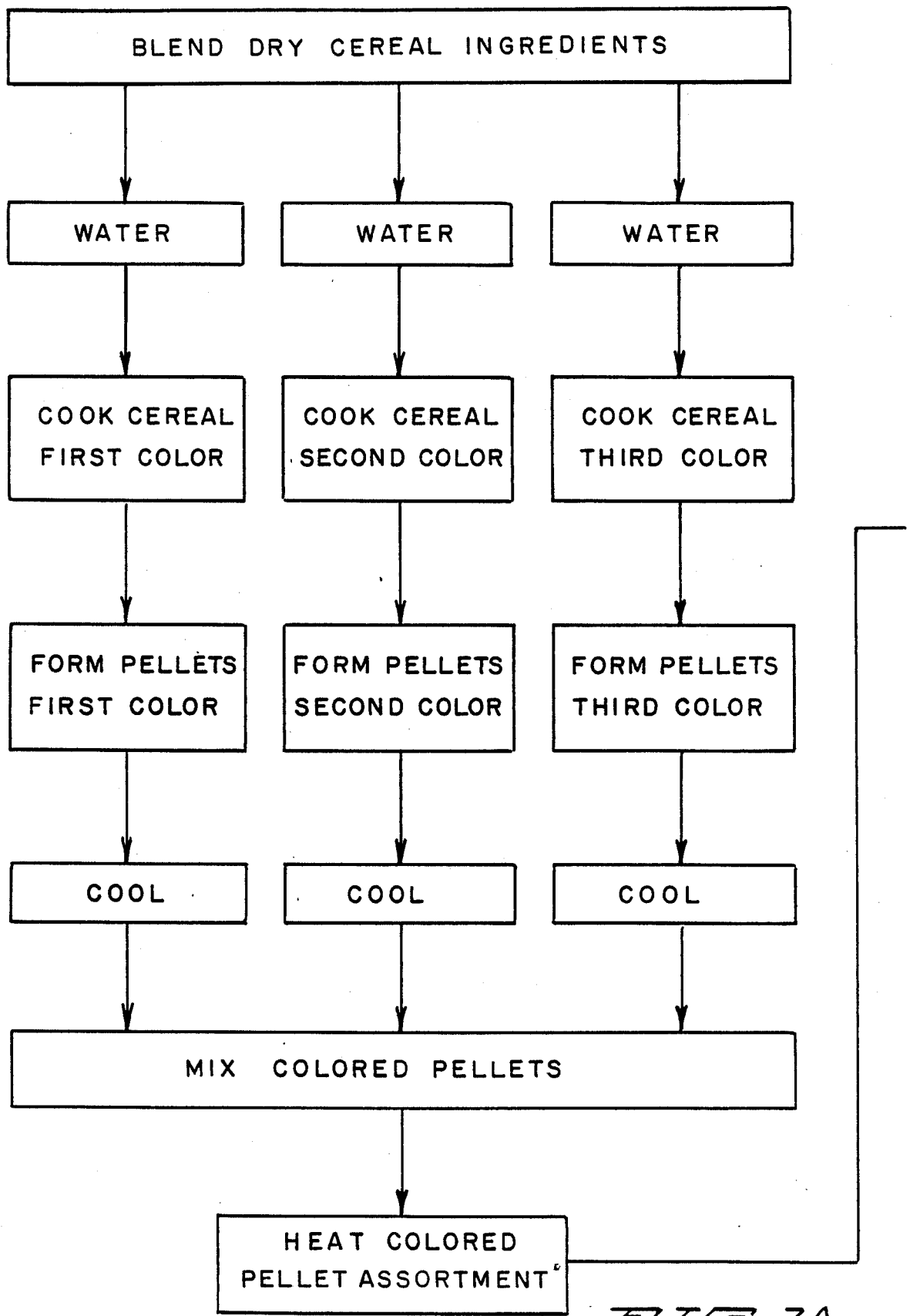

The present invention relates to multicolored R-T-E cereal pieces and to their methods of preparation. The multicolored R-T-E cereal pieces prepared according to the present invention have particular appeal to children. In preferred embodiments, the cereal pieces can have an upper layer and a bottom layer, at least one of which is characterized by a plurality of regions, each of a different color. Each of the product preparation steps are described below in detail.

Throughout the specification and claims, percentages are by weight and temperatures in degrees Fahrenheit, unless otherwise indicated.

The first essential step of the present R-T-E cereal preparation process is to provide separate, segregated quantities of pellets of cooked cereal dough. This step can involve the substeps of providing a plurality of cooked cereal doughs, each of a different color and, second, separately pelletizing these doughs. Useful cereal dough cooking methods herein can include any of several different convention cereal dough categories, including boiling water cookers, steam cookers, low shear high pressure extruders, low shear low pressure cookers, adiabatic extruders, high shear extruders, and high shear extruders with steam precookers.

Thereafter, the cooked cereal doughs are formed into cereal dough pellets using conventional pellet forming apparatus and techniques. However, in the present invention, it is important that the pellets formed be relatively low in moisture content so as to facilitate handling of the pellets in the downstream process, and to ensure proper texture of the finished product.

Conventionally, in the preparation of various R-T-E cereals, the cooked cereal dough has a moisture content of about 30% to 43% prior to pellet formation. In contrast, in the present invention, immediately prior to pellet formation, the cooked cereal doughs have surprisingly low moisture contents essentially ranging from about 18% to 26%, preferably about 20% to 24% and about 22% for best results. Preferred moisture contents within this range will depend in part upon cereal dough composition. For example, when rice is a material cereal dough ingredient, the cooked cereal dough tends towards greater stickiness and thus lower moisture contents are preferred.

The temperature of the cereal doughs during pellet formation can range from about 255° to 310° F., preferably about 260° to 275° F. which is conventional for pellet formation.

The size of the warm, high moisture cereal pellets is not critical per se. However, the cereal pellets desirably range in size from about 1/16" to 5/16" (1.4 to 7 mm), preferably 2/16" to 4/16" (3 to 6 mm) in diameter. Generally, as either the number of colors decrease or the size of the finished cereal piece increases, then the size of the colored pellets are increased. One conventional technique for characterizing pellet size is by a unit referred to as "pellet count." A pellet count is that number of pellets which are required to weigh 10 grams. Pellet counts of about 60 to 130 are preferred for use herein and for best results about 60 to 90.

In the present process, a separate quantity of low moisture, warm cooked cereal dough pellets of one color is prepared. Separately, a second quantity of warm, low moisture, cooked cereal dough pellets of a second color is also prepared. In continuous production, separate processing streams are each dedicated to providing pellets of a single color. If R-T-E cereal pieces having more than two colors, e.g., a third color, as part of the multicolored R-T-E cereal piece, then a third quantity of warm, low moisture cooked cereal dough pellets is provided.

Depending on the end product desired, the quantities of first, second or additional colors can either be the same or different. The composition of the doughs may either be the same or different as well. Moreover, the size of the pellets may vary if desired. Conveniently, the pellets can be of approximately equal size and number and composition.

It is important to obtain free flowing pellets. Generally, the ability of pellets to free flow depends upon reducing their temperature and decreasing their surface moisture. Typically, cereal pellets are dusted with a lubricating agent to help achieve free flowing. Typically, these agents are surfactants or oils, although occasionally particulates have also been used. In the present process such topical applications of anti-stick materials is to be avoided because the lubricating agent on the pellets will prevent the formation of a continuous sheet downstream in the process. If anti-stick materials are applied to the pellets, the sheet formed therefrom can appear ragged with holes therein. Surprisingly, these problems can be minimized when the pellets are cooled and have a lower moisture than typical coated cereal pellets as described herein. Accordingly, in the present process the pellets are preferably substantially free of topically applied lubricating agents.

Thereafter, each quantity of one color is separately cooled apart from the quantities of second or additional cereal pellets. The pellets are cooled to a temperature ranging from about 90° to 140° F. (32° to 60° C.), preferably about 90° to 120° F. and for best results about 90° to 95° F. (32° to 35° C.). Generally, higher moisture pellets require cooling to lower temperatures. Also, cereal pellets of stickier doughs, e.g., rice-based, require even lower moistures and lower pellet temperatures. The cooled pellets are firmer. In contrast, conventional cereal processing employs pellets which are kept at an elevated temperature prior to flaking or sheeting. It is important herein that the moisture content of the cooled pellets remain within the moisture content range of about 18% to 26%. Thus, such intermediate pellet processing steps common in some R-T-E cereal preparation methods such as case hardening (sometimes referred to as densification) or surface drying, or drying without case hardening are to be avoided. Drying or case hardening will prevent the formation of a continuous sheet downstream in the process.

Thereafter, desired quantities of the cooled, firm pellets, each pellet characterized by a single color, are then admixed with low shear mixing at the cooled temperature to form a mixture or, synonymously, an assortment of cooled pellets of first, second or even more colors. It is important that the blending of the pellets be done with as little shear as possible so as to maintain the individual, discrete nature of the pellets. Excessive shear is evidenced when the individual pellets are smeared together causing a blending of the dough. Thus, for example, if a mixture comprising a plurality of blue pellets and a plurality of yellow pellets are admixed with excessive shear, pieces are formed which are not spherical and can result in clumps of blue, yellow and green. Such a result is undesirable. Even higher amounts of shear could result in clumps with gray or brown coloration when three or more colors are employed.

Thereafter, in the next essential step, the mixture of variously colored pellets are then heated to a temperature of about 160° to 180° F. (71° to 82° C.) to form warmed pellets. This heating softens the pellets, rendering them in a condition for subsequent processing.

In the next essential step, the warmed blend of softened pellets are sheeted to form a sheet or layer characterized by a plurality of regions, each region having only one color. The sheeting step is practiced using conventional sheeting apparatus, generally a pair of rollers. The sheet so formed is further characterized by a moisture content still ranging from about 18% to 26%, preferably about 22%, and a temperature of about 140° to 170° F. (60° to 76.6° C.), preferably about 150° to 160° F. (65.5° to 71.1° C.). (Some cooling typically naturally occurs between the previous pellet warming step and the sheet forming step.) The sheeting thickness is not critical per se, and can range from about 0.030 to 0.055 inch (0.675 to 1.23 mm) in thickness, preferably about 0.040 to 0.045 inch (0.9 to 1.008 mm).

In one embodiment of the present invention, the multicolored sheet so formed is subsequently processed in conventional manner to form ready-to-eat cereal pieces. These steps can variously comprise forming, e.g., stamp cutting, the sheet into variously sized and shaped pieces, drying and packaging.

In certain embodiments, the post sheeting R-T-E processing can additionally comprise such steps as toasting, sugar coating, puffing, in various combinations and sequences. In one highly preferred embodiment, after having been formed into desired shapes and sizes, the pieces are dried to a moisture content of about 10%. Thereafter, the reduced moisture pieces are puffed by rapid heating such as in a jet zone dryer. The drying time is controlled to achieve a moisture level of about 2% to 3%. Thereafter, the puffed cereal pieces are sugar coated with a conventional sugar coating and finish dried prior to packaging.

Figure 1B:
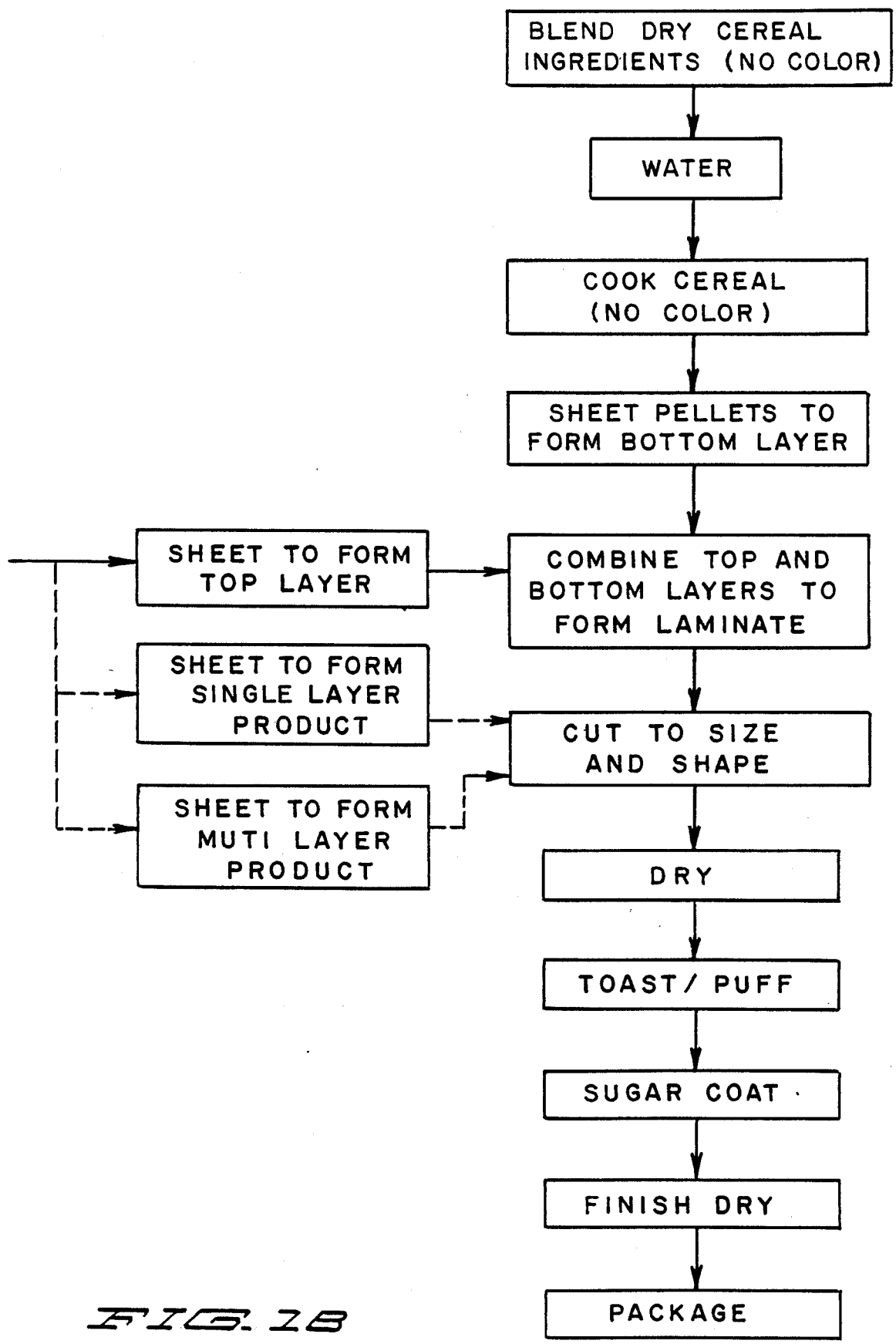

In another highly preferred embodiment of the present invention, a present composite cereal piece is prepared characterized by both an upper layer and a bottom layer. The process for the preparation of this highly preferred embodiment is shown in the block flow diagram depicted as FIGS. 1A and 1B. In this process, the upper layer comprises the multicolored sheet and is prepared as described above. The lower layer, however, is monochromatic. In this embodiment, an additional cooked cereal dough of one color is fed without pelletizing or intermediate cooling directly to the sheeter. The cooked cereal dough has a moisture content of about 22% and a temperature of about 290° F. (143° C.). The multicolored top sheet and underlying monochromatic sheet are layered together in a double sheeting apparatus to form a sheet laminate having a first or top multicolored layer and a second or bottom monochromatic layer. This laminate sheet is then fed to a cutter as described above to form suitably sized and shaped cereal pieces and subsequently processed as described above. Such an operation can also function so as to provide the laminated cereal pieces with a peripheral crimp seam bonding together the first and second layers. Especially desirable R-T-E cereal piece designs are depicted in my copending design patent applications (U.S. Ser. Nos. 335,460, 335,461, 335,462, and 335,463, each filed Apr. 10, 1989.)

In still another variation, the R-T-E cereal comprises both an upper and lower layer, each of which is multicolored or polychromatic, i.e., is characterized by regions of various colors. In these embodiments, a second lower multiple colored sheet is fed to the double sheeting apparatus along with a first, upper multicolored sheet. The sheet laminate so prepared comprises a first, upper multicolored layer and a second, lower multicolored layer. Each layer will have a unique, random color pattern. Moreover, the color pattern will vary from piece to piece.

In still another variation of the present invention, the pellets can be of various cereal compositions. For example, the first color of pellets can be yellow and fabricated from a corn based cereal dough. The second colored pellets can be a second color fabricated from a white, rice based cereal dough. The monochromatic sheet can be, for example, fabricated from still another cooked cereal dough composition such as a cereal dough composition, e.g., based upon a brown rice formulation. Special care should be taken when the pellets of individual colors are fabricated from cereal doughs which are rice based. Rice based cereal dough pellets are relatively more sticky than pellets fabricated from other cereals. Rice based cereal pellets require even milder conditions (i.e., lower moistures and cooler temperatures) for pellet handling in the admixing step.

In the production of an R-T-E cereal, various general procedures used for making such food products are utilized depending upon the desired form, type or condition of the final product. If a flake type cereal product is desired these sheets are fabricated so as to produce the desired flake thickness which generally is in the range of 0.015 to 0.020 inch. Generally, the flakes are then puffed to enhance their crispness and tenderness. A cereal is puffed by rapid heating or rapid decrease in the pressure which converts the dense, hard flakes into more palatable, porous, tender flakes. A toasting operation is generally employed to enhance the color and flavor of the resultant cereal product. Toasting is accomplished by heating the flakes, usually to 200° to 400° F. (93.3° to 204.4° C.). If a puffed shaped product is desired, the sheet thickness should be increased to 0.035 to 0.075 inch and the flaking step should be omitted. A puffing process such as a flow puffing, oven puffing or even gun puffing can be substituted.

In highly preferred embodiments of the present invention, the R-T-E pieces additionally include a presweetening coating. Well known compositions and presweetener coating application techniques can be employed both for sugar coating or when various high potency sweeteners, e.g., aspartame, acetylsulfame K, etc. In more preferred embodiments, the sugar coating solution additionally comprises a flavor constituent and optionally, vitamins. The addition of a flavor constituent to the sugar coating solution is preferred due to flavor losses that can occur from the frying, toasting or puffing steps practiced herein. These steps, due to their heat application, tend to drive off the volatile flavor constituents leading to flavor degradation or loss.

The multiple colored R-T-E cereals prepared as described are particularly suitable for use for children's R-T-E cereals. The cereals can be packaged and distributed in conventional manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A laminated multicolored R-T-E cereal of the present invention is prepared according to the following process. One laminate layer is multicolored while the other is monochromatic. Two separate formulas are used, containing the following ingredients and percents by weight (dry basis).

| Ingredient | Weight % |
|---|---|
| Formula A White Rice Formula | |
| White rice flour | 70.0 |
| Brown rice flour | 13.0 |
| Sugar | 7.7 |
| Coconut oil | 3.0 |
| Salt | 1.0 |
| Wheat starch* | 5.2 |
| Trisodium phosphate | 0.1 |
| | 100.0% |
| Formula B Brown Rice Formula | |
| Brown rice flour | 80.0 |
| Sugar | 5.7 |
| Coconut oil | 2.3 |
| Salt | 2.3 |
| Dextrose | 3.3 |
| Non-fat dry milk | 1.8 |
| Wheat starch* | 4.5 |
| Trisodium phosphate | 0.1 |
| | 100.0% |

*Wheat starch supplied by General Mills, Inc. under the brand name Aytex P or Paygel P.

Three individual batches of Formula "A" were prepared, each of which was a specific color: batch 1 was red, batch 2 was blue, batch 3 was white. Formula "B" was prepared with no added color.

The doughs were cooked in a conventional manner using a single screw cooker extruder with preconditioning. The doughs were cooked to a moisture of approximately 20% to 22% and a temperature of 290° F. (143° C.).

The warm, cooked, colored doughs of Formula "A" were then formed into pellets using a conventional single screw forming extruder with a face cutter. Individual batches of red pellets, white pellets and blue pellets were produced. The pellet diameter was approximately 1/4 inch. The pellet moisture was 20% to 22% and the pellet temperature was approximately 260° F. (126.6° C.).

Thereafter, the batches of colored pellets were immediately cooled to 80° to 90° F. (26.6° to 32.2° C.) using conventional air cooling methods to form cooled pellets. The cooling was done to prevent stickiness and to firm up the pellet texture in order to allow free flow. No lubricating agents were applied to the pellets.

The cooled batches of red pellets, white pellets and blue pellets were then mixed together in a conventional low shear mixer. A ribbon blender mixer was used, mixing equal proportions of red, white, and blue pellets. The mixing process yielded a single batch of cool, free flowing pellets of the assorted red, white, and blue colors. All of the pellets remained whole and none were mashed and no bleeding of colors occurred.

The batch of assorted colored pellets was then heated to 160° to 180° F. (71.1° to 82.2° C.) using a conventional pellet heating unit. The pellets were then fed as a single layer onto a conveyor belt, which moved the pellets slowly beneath a conventional bank of infrared heating elements to bring the pellets to the 160° to 180° F. (71.1° to 82.2° C.) temperature. The heating resulted in the necessary softening of the pellets prior to sheeting.

The warm, soft pellets were then formed into a single sheet 0.045 inch thick and 9 inches wide. The sheeting was done using a conventional dough sheeting unit comprised of two rolls spread 0.045 inches apart, rotating in opposite directions into the nip. The resulting sheet of dough was a continuous strip of red, white, and blue colors. Each colored area was distinct with no blending or bleeding of any two colors and with patterns of random size and shape. The moisture of the sheet was 20% to 22% and the temperature was 140° to 160° F. (60° to 71.1° C.).

A second sheet of equal dimensions, moisture and temperature was then produced using the warm cooked dough from Formula "B." This dough was fed directly without pelleting from the cooking extruder at a temperature of 290° F. (143.3° C.) and a moisture content of about 22% into a set of sheeting rolls identical to those described above. This set of sheeting rolls was located directly above the conveyor belt carrying the multicolored sheet of Formula "A." This allowed the sheet of Formula "B" to be layered directly on top of the multicolored Formula "A" sheet. The result was a continuous double layered strip with red, white and blue multicolors on the bottom and plain brown on the top.

This double layered strip was then cut into various shapes and sizes using a conventional rotary cutting unit. The shapes included squares, hexagons, triangles and circles. Each piece consisted of a multicolored side and a plain brown side.

The double sided, shaped pieces were then dried from 20% to 22% moisture down to approximately 10% moisture. The drying unit was a conventional forced air convection dryer. The pieces were dried at 180° F. for 30 minutes.

The dried pieces were then puffed in a conventional jet zone dryer at 500° F. for 20 seconds. The puffed product density was 215–280 grams per 130 cc. This is similar in density and texture to other ready-to-eat cereals. The final moisture was approximately 2% to 3%. The R-T-E cereals so prepared were characterized by one surface having a plurality of colors while the reverse side was monochromatic.

EXAMPLE 2

A variation of the above is to produce a double layer piece such that both the top and the bottom layers are multicolored. This is accomplished by producing two multicolored sheets of red, white, and blue and layering them together in the same manner described above. Formula "B" is not necessary in this case. The cooking, pellet forming, cooling, warming, sheeting, cutting, drying and puffing methods are all identical to Example 1.

EXAMPLE 3

Another variation employing a process similar to that of Example 2 is to produce an R-T-E cereal piece with two or more colors on the top side and two or more different colors on the bottom side. For example, the top is red, white and blue and the bottom is orange, yellow and green.

EXAMPLE 4

Another variation is to produce a single layer multicolored piece by eliminating the double sheeting step. All other process steps are the same.

EXAMPLE 5

Another variation is to produce a multicolored piece with each color originating from a particular grain. For example, white rice, yellow corn, brown wheat. A white, yellow and brown cereal piece was produced using Formula "A" above and the following:

| | Formula C Yellow Corn |
|---|---|
| Ingredient | Weight (dry basis) |
| Yellow corn cones | 72.0 |
| Oat flour | 5.5 |
| Wheat flour | 10.0 |
| Sugar | 8.0 |
| Coconut oil | 2.0 |
| Salt | 2.5 |
| | 100.0% |

| | Formula D Brown Wheat |
|---|---|
| Ingredient | Weight % |
| Cut wheat | 40.0 |
| Rice flour | 33.0 |
| Sugar | 15.0 |
| Coconut oil | 3.5 |
| Dextrose | 4.3 |
| Salt | 2.5 |
| Non-fat dry milk | 1.7 |
| | 100.0% |

Each of the three formulas were cooked using a conventional single screw cooking extruder as in Example 1. Formula "A" was cooked to 290° F. and 20% to 22% moisture. Formula "C" was cooked to 22% to 24% moisture and 280° F. Formula "D" was cooked to 24% to 26% moisture and 270° F.

The warm cooked doughs were formed into pellets as in Example 1 and cooled to achieve free flow as in Example 1. Formula "A" pellets were cooled to 80° F. Formula "C" pellets were cooled to 100° F. Formula "D" pellets were cooled to 110° F.

Generally, the stickier the grain, the lower the temperature required to achieve free flow.

The three separate batches of pellets were then mixed together as in Example 1 to yield a single batch of assorted white, yellow and brown pellets.

The remainder of the process steps were identical to Example 1 with the exception of the double layering step. The resulting product was a single layer multicolor piece of yellow, white and brown, each color consisting of a separate grain composition: corn, rice, and wheat.

EXAMPLE 6

Still another variation of each of the above is to apply a sugar coating to the cereal pieces. This is done in a conventional manner by spraying a sugar based slurry, with or without flavor additive, onto the puffed pieces in a drum enrober. The coated pieces are then dried down to approximately 2% moisture in a conventional forced air dryer.

What is claimed is:

1. A method for preparing a single layer multicolored R-T-E cereal piece, comprising the steps of:
   A. providing a plurality of separate segregated quantities of low moisture cooked cereal pellets, comprising a first and second quantity of cooked cereal pellets,
      said first quantity of warm pellets having a first color and said second quantity of warm pellets having a second color,
      wherein all the cereal pellets have a temperature ranging from about 255° to 310° F., and a moisture content ranging from about 18% to 26% by weight;
   B. separately cooling the quantities of warm, low moisture pellets to a temperature ranging from about 60° to 120° F. while maintaining the moisture content to form cooled low moisture pellets;
   C. admixing the cooled, low moisture pellets while cool with low shear mixing to form a mixed assortment of cooled, low moisture pellets of first and second color;
   D. heating the assortment of pellets to a temperature of about 160° to 180° F. to soften the pellets to form an assortment of warm, softened pellets having a moisture content of about 18% to 26% by weight;
   E. sheeting the pellets to form a sheet comprising a plurality of regions of random shape, each region having only one color;
   F. forming the sheet into pieces; and
   G. forming the pieces into ready-to-eat cereal pieces.

2. The method of claim 1 wherein in Step A the pellets have a pellet count of 60 to 120 per 10 g, and wherein in Step E the sheet ranges in thickness from about 0.030 to 0.055 in.

3. The method of claim 2 wherein Step G includes the substeps of:
   drying the pieces to a moisture content ranging from about 8% to 12% by weight to form partially dried cereal pieces; and
   toasting the partially dried cereal pieces to toast and finish dry the pieces to form toasted ready-to-eat cereal pieces having a moisture content of less than 3% by weight.

4. The method of claim 3 wherein the cooked cereal dough pellets comprise puffable cereal dough.

5. The method of claim 4 wherein in Step G the toasting step is practiced to puff the pieces along with toasting and drying.

6. The method of claim 5 wherein the cereal pellets are free of topically applied particulate or liquid anti-stickiness materials.

7. The method of claim 6 wherein Step A comprises a third quantity of cooked cereal pellets having a third color.

8. The method of claim 7 wherein Step G further includes the substeps of:
   providing the ready-to-eat cereal pieces with a pre-sweetening coating.

9. The method of claim 7 wherein Step G further includes the substeps of:
   coating the ready-to-eat cereal pieces with a sugar coating solution to form coated cereal pieces,
   drying the coated cereal pieces.

10. A method for preparing a laminated R-T-E cereal piece having a multicolored layer and a monochromatic layer, comprising the steps of:
    A. providing a plurality of separate segregated quantities of low moisture cooked cereal pellets, comprising a first and second quantity of cooked cereal pellets,
       said first quantity of warm pellets having a first color and said second quantity of warm pellets having a second color,
       wherein all the cereal pellets have a temperature ranging from about 255° to 310° F., and a moisture content ranging from about 18% to 26% by weight;
    B. separately cooling the quantities of warm, low moisture pellets to a temperature ranging from about 60° to 120° F. while maintaining the moisture content to form cooled low moisture pellets;
    C. admixing the cooled, low moisture pellets while cool with low shear mixing to form a mixed assortment of cooled, low moisture pellets of first and second color;
    D. heating the assortment of pellets to a temperature of about 160° to 180° F. to soften the pellets to form an assortment of warm, softened pellets having a moisture content of about 18% to 26% by weight;
    E. sheeting the pellets to form multicolored sheets comprising a plurality of regions of random shape, each region having only one color;
    F. forming a laminated sheet of cooked cereal dough comprising an upper layer from a first sheet and a bottom layer from a second sheet;
    G. forming the sheet into pieces; and
    H. forming the pieces into ready-to-eat cereal pieces.

11. The method of claim 10 wherein in Step A the pellets have a pellet count of 60 to 120 per 10 g, and wherein in Step E the sheet ranges in thickness from about 0.030 to 0.055 in.

12. The method of claim 11 wherein Step H includes the substeps of:
    drying the pieces to a moisture content ranging from about 8% to 12% by weight to form partially dried cereal pieces; and
    toasting the partially dried cereal pieces to toast and finish dry the pieces to form toasted ready-to-eat cereal pieces having a moisture content of less than 3% by weight.

13. The method of claim 12 wherein the cooked cereal dough pellets comprise puffable cereal dough.

14. The method of claim 13 wherein in Step H the toasting step is practiced to puff the pieces along with toasting and drying.

15. The method of claim 14 wherein the cereal pellets are free of topically applied particulate or liquid anti-stickiness materials.

16. The method of claim 15 wherein in Step G, the pieces are cut to form having a peripheral crimp seam binding together the first and second layers.

17. The method of claim 16 wherein Step A comprises a third quantity of cooked cereal pellets having a third color.

18. The method of claim 17 wherein Step G further includes the substeps of:

providing the ready-to-eat cereal pieces with a presweetening coating.

19. The method of claim 18 wherein Step G further includes the substeps of:
coating the ready-to-eat cereal pieces with a sugar coating solution to form coated cereal pieces,
drying the coated cereal pieces.

20. A method for preparing a laminated multicolored R-T-E cereal piece having a first upper multicolored layer and a second, lower, multicolored layer, comprising the steps of:
A. providing a plurality of separate segregated quantities of low moisture cooked cereal pellets, comprising a first and second quantity of cooked cereal pellets,
said first quantity of warm pellets having a first color and said second quantity of warm pellets having a second color,
wherein all the cereal pellets have a temperature ranging from about 255° to 310° F., and a moisture content ranging from about 18% to 26% by weight;
B. separately cooling the quantities of warm, low moisture pellets to a temperature ranging from about 60° to 120° F. while maintaining the moisture content to form cooled low moisture pellets;
C. admixing the cooled, low moisture pellets while cool with low shear mixing to form a mixed assortment of cooled, low moisture pellets of first and second color;
D. heating the assortment of pellets to a temperature of about 160° to 180° F. to soften the pellets to form an assortment of warm, softened pellets having a moisture content of about 18% to 26% by weight;
E. sheeting the pellets to form a sheet comprising a plurality of regions of random shape, each region having only one color;
F. providing a monochromatic sheet of cooked cereal dough;
G. forming a laminated sheet of cooked cereal dough comprising the multicolored sheet as one layer and the monochromatic sheet as a second layer;
H. forming the laminated sheet into pieces; and
I. forming the pieces into ready-to-eat cereal pieces.

21. The method of claim 20 wherein in Step A the pellets have a pellet count of 60 to 120 per 10 g, and wherein in Steps E and F the sheets each range in thickness from about 0.030 to 0.055 in.

22. The method of claim 21 wherein Step I includes the substeps of: drying the pieces to a moisture content ranging from about 8% to 12% by weight to form partially dried cereal pieces; and toasting the partially dried cereal pieces to toast and finish dry the pieces to form toasted ready-to-eat cereal pieces having a moisture content of less than 3% by weight.

23. The method of claim 22 wherein the cooked cereal doughs comprise puffable cereal dough.

24. The method of claim 23 wherein in Step I the toasting step is practiced to puff the pieces along with toasting and drying.

25. The method of claim 24 wherein the cereal pellets are free of topically applied particulate or liquid antistickiness materials.

26. The method of claim 25 wherein in Step G, the pieces are cut to form having a peripheral crimp seam binding together the first and second layers.

27. The method of claim 26 wherein Step A comprises a third quantity of cooked cereal pellets having a third color.

28. The method of claim 27 wherein step G further includes the substeps of:
providing the ready-to-eat cereal pieces with a presweetening coating.

29. The method of claim 28 wherein Step G further includes the substeps of:
coating the ready-to-eat cereal pieces with a sugar coating solution to form coated cereal pieces,
drying the coated cereal pieces.

* * * * *